United States Patent
Bierschenk

(10) Patent No.: US 11,916,801 B2
(45) Date of Patent: Feb. 27, 2024

(54) METHOD FOR INTEGRATING INTERFACE DEVICES INTO A NETWORK

(71) Applicant: Robert Bosch GmbH, Stuttgart (DE)

(72) Inventor: Jens Bierschenk, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/151,032

(22) Filed: Jan. 6, 2023

(65) Prior Publication Data

US 2023/0231812 A1    Jul. 20, 2023

(30) Foreign Application Priority Data

Jan. 14, 2022 (DE) .................... 10 2022 200 414.0

(51) Int. Cl.
*H04L 47/33* (2022.01)
(52) U.S. Cl.
CPC .................... *H04L 47/33* (2013.01)
(58) Field of Classification Search
None
See application file for complete search history.

(56) References Cited

U.S. PATENT DOCUMENTS

| | | | |
|---|---|---|---|
| 2007/0140170 A1* | 6/2007 | Jagana | H04L 45/00 455/436 |
| 2009/0059842 A1* | 3/2009 | Maltseff | H04W 40/32 370/328 |
| 2011/0010441 A1* | 1/2011 | Gutierrez | H04L 43/18 709/223 |

OTHER PUBLICATIONS

Benzekki et al. "Software-Defined networking (SDN): a survey," Security Communication Networks (2016); pp. 5803-5833.

* cited by examiner

*Primary Examiner* — Angela Nguyen
(74) *Attorney, Agent, or Firm* — NORTON ROSE FULBRIGHT US LLP

(57) ABSTRACT

A method for integrating interface devices into a network, the network including at least one central software-based controller, which logically separates a data plane from a control plane using multiple interface devices. The method includes: a receiving of a first recognition message of the central controller at a terminal of an interface device; a checking of whether a previous recognition message has been received at another terminal of the interface device within a predefined time period prior to the receipt of the first recognition message; and a forwarding of the first recognition message to all network users connected to the interface device, if no previous recognition message has been received at another terminal within the predefined time period.

12 Claims, 4 Drawing Sheets

METHOD FOR INTEGRATING INTERFACE DEVICES INTO A NETWORK

FIELD

The present invention relates to a method for integrating interface devices into a network and to a processing unit and to a computer program for carrying out the method.

BACKGROUND INFORMATION

Computer networks may be found today in all technical fields. In the automotive sector as well, the development of vehicle control is trending increasingly toward a plurality of networked components such as, for example, different control units, sensors, user interfaces and vehicle functions. For this purpose, different bus systems and technologies are utilized such as, for example, CAN bus or Ethernet, which may also be combined in the vehicle.

Whereas a certain flexibility is a given for stationary computer networks in terms of equipment, redundant components and the like, limited resources with simultaneous high demands on speed and safety of the communication across the networks play a major role in the vehicle. In order to efficiently utilize the resources present, concepts are therefore increasingly used which make it possible to distribute and to preferably flexibly assign tasks between different control units. This includes, for example, the logical partitioning of the network via multiple virtual LANs (VLAN) or the "Software Defined Networking" (SDN), in which the data plane and control plane are decoupled by using a central software-based controller and the control is centralized. The control plane determines to where data are to be transferred, whereas the data plane is used physically for the transfer to the established target. Protocols established in the case of SDN such as, for example, the OpenFlow protocol, may be used for communicating between the controller and forwarding network components on the control plane such as, for example, switches or routers.

However, many of these technologies were originally developed under different conditions and are not able to be simply transferred to the application in the vehicle and to the required conditions.

SUMMARY

According to the present invention, a method for integrating network users or interface devices in a vehicle network, as well as a processing unit and a computer program for carrying out the method including the features of the present invention are provided. Advantageous embodiments of the present invention are disclosed herein.

Such a method may be applied, in particular, in a network, which includes at last one central software-based controller, which logically separates a data plane from a control plane that includes multiple interface devices. The present invention creates a simple and efficient approach for a vehicle network.

According to an example embodiment of the present invention, the method initially includes receiving an initial recognition message of the central controller at a terminal of an interface device. Subsequently, it is checked whether a previous recognition message has been received at another terminal of the interface device within a predefined time period prior to the receipt of the initial recognition message, and the initial recognition message is forwarded to all network users connected to the interface device, if no previous recognition message has been received at another terminal within the predefined time period. With this method, it is possible to use a broadcast message with no other addressing in order to integrate new users in an SDN network, without jeopardizing in the process the operability of the network as a result of redundant forwardings. Such a method is suitable, in particular, for a protocol that uses only the second layer of the OSI model, so that no higher layers need to be addressed. In this way, the required complexity of the software used, for example, between control units in the vehicle, may be significantly reduced.

According to one preferred specific embodiment of the present invention, the above-described check step may include the retrieval of a stored point in time at which the previous recognition message has been received, and the determination of a time period that has elapsed between the stored point in time and a point in time at which the initial recognition message has been received. Accordingly, whenever a recognition message is forwarded, the point in time at which this recognition message has been forwarded may also be stored. By simply detecting and storing a reception point in time, it becomes possible to discard all recognition messages received within an established short time window in order to prevent redundant forwardings.

In addition or alternatively, a timer or timing element having the duration of the predefined time period may be started when a recognition message is received. For the check of the time window described, it may then be simply checked whether an active timer of a previous recognition message is instantaneously present.

According to an example embodiment of the present invention, it is equally possible when a recognition message is received to start a timer for the duration of the predefined time period and to also store a reference to the received recognition message. Once the timer has expired, it is possible to delete this stored reference again. To check whether a previous recognition message has been received at another terminal of the interface device within a predefined time period prior to the receipt of the initial recognition message, it may then be checked whether a stored reference to a previous recognition message is instantaneously present. If this is the case, the more recent recognition message has been received within the predefined time window and it may be discarded, otherwise it may be forwarded as usual as broadcast.

If the check indicates that the instantaneous recognition message is not to be forwarded, the timer may then be deactivated and/or the stored reference to the recognition message may be deleted. This ensures that the time window since the first receipt and forwarding of the recognition message are each checked.

In addition, the method may optionally also include the detection of the terminal or port of the interface device on which the initial new recognition message has been received. When checking the time window, it may then also be checked, for example, whether a previous recognition message was received on the same terminal, and if this is the case, the instantaneous recognition message may be forwarded independently of whether it has been received within the predefined time period.

Furthermore, according to an example embodiment of the present invention, the recognition messages that are received and detected at an interface unit may trigger the establishment of a communication link between the central controller and the interface device. It is understood that this applies particularly when no valid communication link to the controller has previously been established. The establishment of the link may include an exchange of suitable unicast messages and informs the controller about the presence of the interface device and the attached network nodes.

The recognition message described here may include at least one data element, which indicates that the recognition message is provided for forwarding to other network users, i.e., that it is a broadcast message.

A processing unit according to the present invention, for example, a control unit of a motor vehicle or a switch or router in a vehicle network is, in particular, programmed to carry out a method according to the present invention.

The implementation of a method according to the present invention in the form of a computer program or computer program product including program code for carrying out all method steps is advantageous, since this results in particularly low costs, in particular, if a performing control unit is also used for further tasks and is therefore already present. Finally, a machine-readable memory medium is provided including a computer program stored thereon as described above. Suitable memory media or data media for providing the computer program are, in particular, magnetic, optical and electrical memories such as, for example, hard disks, flash memories, EEPROMs, DVDs and the like. It is also possible to download a program via computer networks (Internet, Intranet etc.). Such a download in this case may take place in a hardwired or cabled or wireless manner (for example, via a WLAN network, a 3G, 4G, 5G, or 6G connection, etc.).

Further advantages and embodiments of the present invention result from the description and from the figures.

The present invention is schematically represented in the figures based on exemplary embodiments and is described below with reference to the figures.

DETAILED DESCRIPTION OF EXAMPLE EMBODIMENTS

Figure 1:
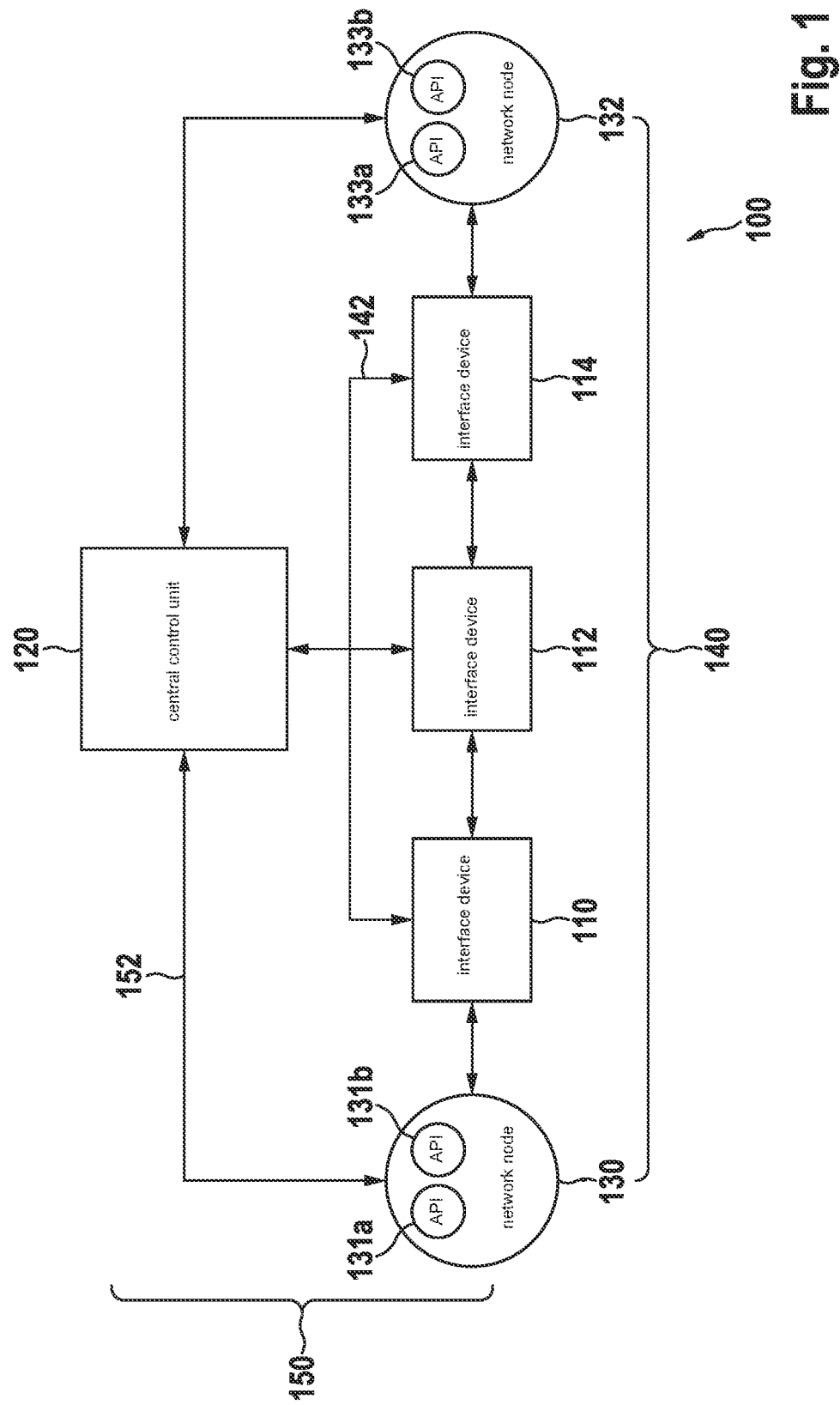
FIG. 1 shows an exemplary network system, in which specific embodiments of the present invention may be applied.

FIG. 1 shows a system, in which specific embodiments of the present invention may be applied. In this system, multiple network nodes are connected to one another in a communication network 100. In this case, for example, it may be a network in a vehicle, with which different control units, sensors or other terminals for the most differing vehicle functions are connected to one another for data transfer and control, but it is not limited to a vehicle network. Such a network may be designed, in particular, on the basis of the Ethernet standard and may connect multiple network nodes for communication with one another with the aid of cabled connection elements. Each network node may include a unique identifier, for example, a MAC (Media Access Control)-address in the conventional format. This identifier may in turn be used for, among other things, addressing in the network.

In order to connect different networks, network segments or individual nodes to one another, interface devices may be used in a conventional manner, which are able to forward, for example, data in a particular manner to one or to multiple network nodes or to other interface devices. For this purpose, hubs, switches, bridges or routers are used. Hubs and repeaters serve as simple distributors on the physical layer (layer 1) of the OSI model, which forward the incoming data traffic to connected network nodes, a hub serving as a repeater for multiple connected network nodes. A bridge connects two network segments on the data security layer (layer 2) of the OSI model and filters the data traffic conducted via the bridge, so that each network segment receives only the data that are intended for a network node within this segment.

This reduces the load in the remaining segments. Switches are essentially bridges which, however, connect multiple network segments to one another on the data security layer and like hubs, are usually fitted with multiple terminals (ports) for network nodes. Thus, switches are normally able to forward the data traffic in an address-based manner in each case only on the connections and terminals for which the respective data are provided. Moreover, data may be buffered and may be conveyed according to predefined methods at particular times or in a particular sequence, so that collisions are able to be avoided. Routers on the other hand forward data on the network layer (layer 3 of the OSI model) and are able to also convey data using TCP/IP and/or UDP/IP protocol stacks to other or from other network segments and thus to also link multiple heterogeneous networks to one another. Interface devices are also able to assume several of these functions; for example, a layer 3 switch may be able to serve both as a switch on the data security layer and also as a router on the network layer.

In the present example in FIG. 1, three or more interface devices 110, 112, 114 such as switches or routers are provided in a network 100, which are able to communicate with one another via suitable connections, and which are provided in a vehicle for connecting network segments to one or to multiple network nodes or end nodes 130, 132 such as, for example, control units or network-capable sensors. Each network node may also include, in particular, a dedicated switch 110, 114; equally however, multiple network nodes may also be connected at one switch via multiple ports. Different applications or services 131, 133 may also be carried out on network nodes 130, 132. For this purpose, the end nodes send and receive data from or to other users of the network via interface devices 110, 112, 114. For forwarding data, the interface devices may have fixed rules, which are defined, for example, as tables (switch table) and are stored. The addresses or identifiers of connected devices, the forwarding rules for particular data, and similar processes, among others, may be established in such tables.

The network in this case is to be designed according to the principle of the "Software Defined Networking" (SDN), so that data plane 140 and control plane 150 are decoupled by using a central software-based controller or a central control unit 120 and the control is centralized. The control plane determines to where the data are to be conveyed, whereas the data plane is used physically for the conveyance to the established target.

The connection directions or logical interfaces for control plane 150 and data plane 140 via central controller 120 are usually also differentiated between "southbound" and "northbound," in this case southbound interface 142 including the communication of central controller 120 to the elements of data plane 140, i.e., the communication with interface devices such as switches/bridges and routers 110, 112, 114 of the network, whereas northbound interface 152 refers to the communication on control plane 150 between central controller 120 and network nodes 130, 132, i.e., the communication of controller 120 with applications and the provision of services via suitable application interfaces 131*a*, 131*b*, 133*a*, 133*b* (application interface, API) of the respective network nodes. In principle, more than one central SDN controller may also be present in this case which, in turn, may be connected to a portion of the network users or to all network users. Thus, the central control may also be assumed by multiple parallel controllers, even though only one controller 120 is shown in the present example. Instead of individual network nodes 130, 132, multiple terminals, further sub-networks or further interface devices may also be connected via one interface device. For example, a central Ethernet network including multiple interface devices may be present, one or multiple of the interface devices providing an interface in another type of network via suitable adapters, for example, for connection to a local CAN bus in the vehicle. Further details of the Software Defined Networking for implementing the method described herein may be found, for example, in the article "Software Defined Networking (SDN): A Survey," Security and Communication Networks 2016, pp. 5803-5833, John Wiley & Sons Ltd.

According to the present invention, a protocol now occurs in such an SDN network 100 for the data traffic of southbound interface 142 and for the functions of data plane 140, which is based preferably completely on the data link layer or OSI layer 2 and thus requires no TCP/IP and/or UDP/IP protocol stack or other higher layer protocols. The following explanations therefore relate, in particular, to the communication of data plane 140 or of southbound interface 142.

The data exchange between the controller and the interface devices may be based on a request-response method. In this method, one of the two sides sends in each case a query or request message, which is followed by a corresponding response message from the other side. Thereafter, the next query may be conveyed. A corresponding response message is conveyed by the interface device in response to each request message of a user, for example, of the controller, further steps optionally also being able to be carried out prior to the conveyance of the response.

In the process, data may be exchanged in predefined formats, in particular, for example, in data frames according to the conventional Ethernet standard IEEE 802.3. Thus, for example, a fixed size or a fixed maximum size may be established for a data frame, the data frame being able to be divided into different data fields for different purposes. The data fields may also be provided with fixed or flexible lengths.

Different message types may also be defined, which serve different purposes. Particular formats and lengths based on the predefined data frames may be established for these message types as well. For example, messages for establishing a communication link may also be provided, such as error messages, messages for changing established sequences in the interface device or information messages.

The interface devices, which are provided for forwarding data packets in the network may be provided in this case with tables, in which entries for provided forwarding sequences are applied.

These entries may be assigned by the SDN controller and reapplied, deleted, or modified by the interface device in response to a corresponding request message from the controller to the interface device. Arriving data packets may then be compared with the entries of this table, for example, based on its header or on other predefined data fields, so that a data packet that is addressed to a particular user may be correctly forwarded to this user. Upon arrival of a packet at an interface device, the correct forwarding sequences may also be dynamically queried and established via communication with the controller. Thus, for example, the ports of an interface device may be assigned to the MAC addresses or to similar user identifiers of receivers. Such tables are available, for example, in the OpenFlow protocol. In principle, however, the use of forwarding rules may take place in an arbitrary manner.

The terminals (ports) that may be used by an interface device for receiving and for forwarding data packets may be formed both by physical ports of the hardware used as well as by logical ports.

The remaining features of a network communication according to the Ethernet Standard or the "Software Defined Networking" are conventional and are not described in further detail here, for example, field lengths in data fields, mechanisms of the packet transfer, error messages, the integration of multiple VLANs or other details. An interface device that supports the method presented herein may additionally also be configured to support the methods of other protocols, for example, OpenFlow, VLANS or conventional Ethernet switching methods. It is also possible that particular terminals or ports of such an interface device are configured for use with the methods represented herein and others are not. Moreover, protocols other than those mentioned here may also be applied or developed.

In order to reintegrate devices or network nodes via their associated interface devices into the network and to enable a communication via the data link layer on the basis of the unique user identifier, the central controller must be able to automatically recognize these interface devices. For this purpose, a recognition method may be provided, in which a recognition message is conveyed via a broadcast message from the central controller to all network users.

In the process, however, an overload of the network could at least partially occur as a function of the network topology used, i.e., of the connections of the network users and, in particular, of the interface devices between one another, since by definition, this overload is duplicated by each interface device and forwarded on all outputs or ports. Thus, in a redundant connection between at least two interface devices, a so-called flooding occurs, which results in an overload of the switches or interface devices.

Various methods in fact exist in the Ethernet Standard for preventing a flooding such as, for example, the "Spanning Tree Protocol" (STP) or different variants thereof. In this case, it is ensured that only one valid path exists for each switch. Since, however, a large part of the network communication in a vehicle is time- and safety-critical, delays occurring as a result are not acceptable, so that these protocols are not used in the automotive sector.

A modified broadcast method is therefore explained below.

Figure 2:
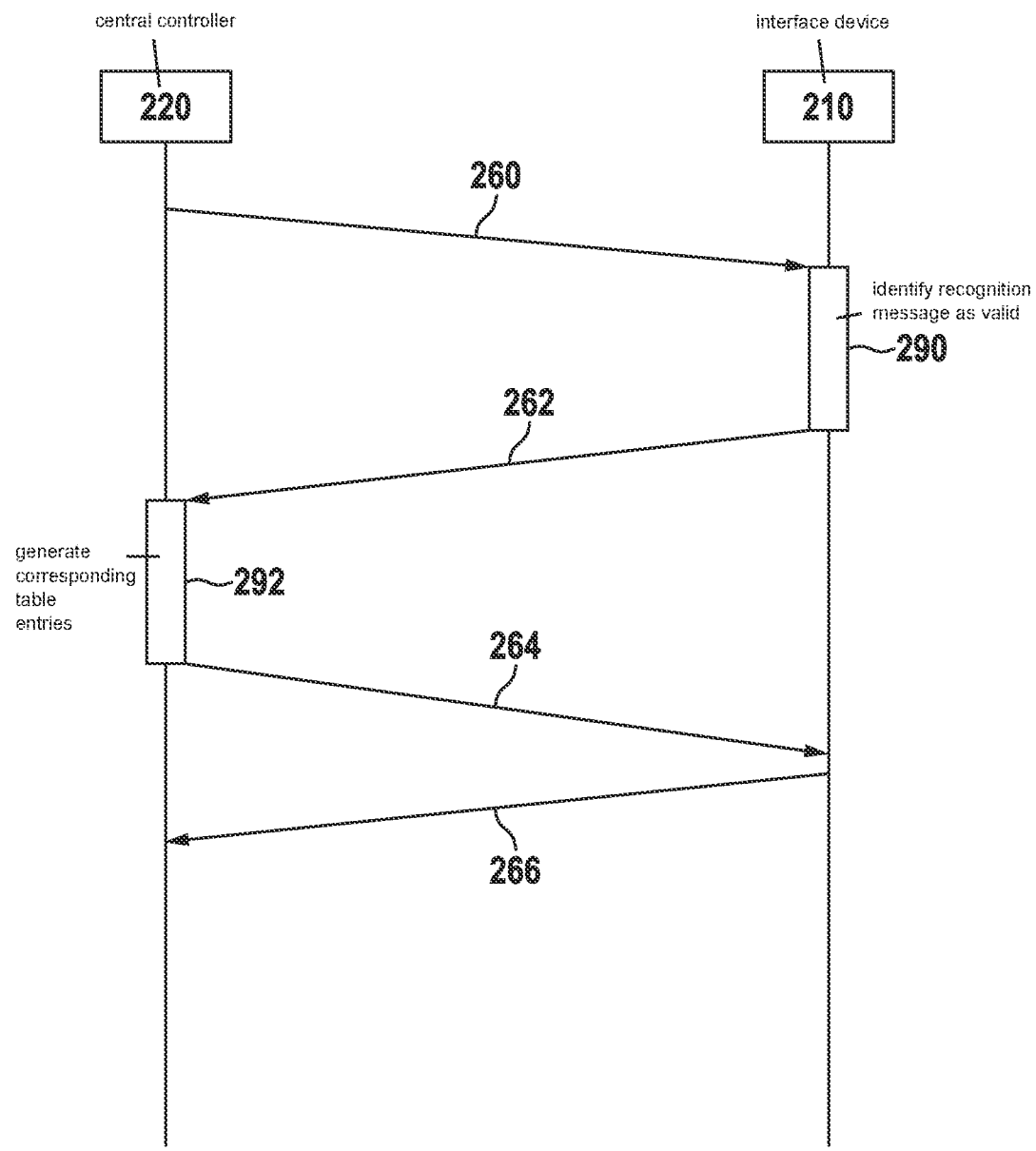
FIG. 2 shows an exemplary sequence diagram for establishing a connection between a controller and an interface device, according to the present invention.

FIG. 2 shows a sequence diagram for one exemplary specific embodiment of a recognition method including an interface device 210 not yet integrated. In this case, a recognition message 260 in the form of a broadcast message is initially sent by the central controller 220. The classification of the broadcast message in this case may, for example, be shown by using a broadcast address (for example, FF-FF-FF-FF-FF-FF) in the MAC address field, as provided in the Ethernet Standard; other methods may, however, also be utilized in order to enable the users to recognize it as a broadcast message. A broadcast message in this case is understood to mean a message that is provided to be conveyed to all users of a network or of a subnetwork without a targeted address.

The recognition message is then received and processed at each of the interface devices connected at controller 220.

The communication with one of these interface devices 210 is shown by way of example in the sequence diagram, the interface device in this case not yet including to this point any active communication link to SDN controller 220. If the interface device that has received as a broadcast a recognition message 260 is familiar with the protocol provided herein, it may identify the recognition message in step 290 as valid and thereupon establish a connection with controller 220.

To establish the connection, the interface device may initially generate a new entry in the switch table of the interface device using a static addressing rule and subsequently send a response message 262 associated with recognition message 260 from interface device 210 back to central controller 220. The controller is thus informed about the presence of the compatible interface device. Controller 220 is now able to generate corresponding table entries in step 292 based on the received characteristics of the interface device, for example, based on conveyed user identifiers, which may then be utilized by all users connected to the controller. The connection between the interface device and the controller may preferably be configured as a pure unicast connection and may include suitable request messages and response message 264, 266.

In order to prevent an overload of the network by multiple duplicated recognition messages, each interface device that is able to also forward messages may also check whether a previous recognition message has already been received on another port within a fixed time period. If this is the case, the interface device may assume that it is a duplicate of the previously received message, and is able to establish that in spite of the characteristic as a broadcast message, this message is not forwarded on its remaining ports.

Figure 3:
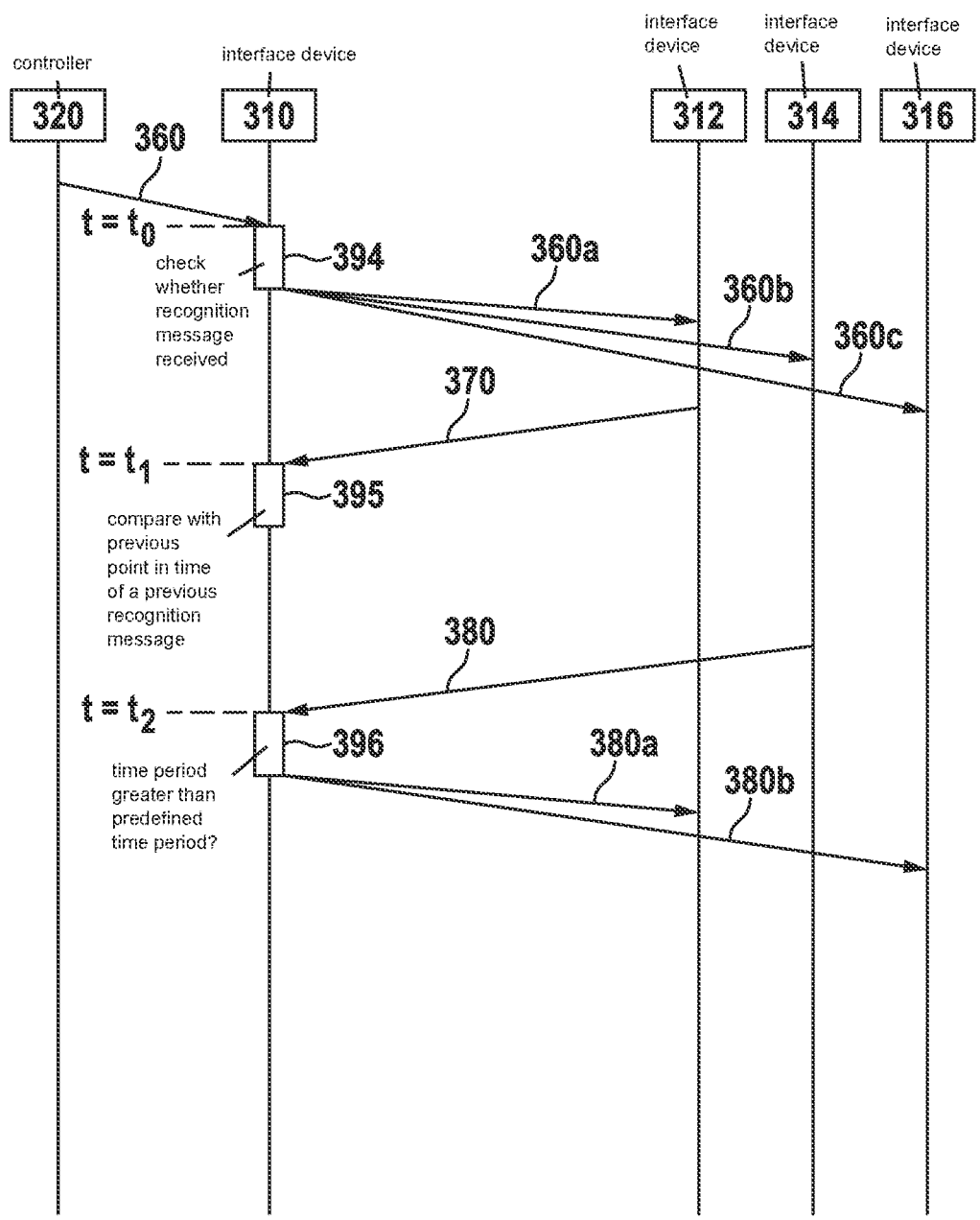
FIG. 3 shows an exemplary sequence diagram for checking recognition messages, according to the present invention.

FIG. 3 shows a diagram including an exemplary method sequence. In this case, a recognition message 360 is again conveyed as a broadcast message and is received by the interface unit 310. To simplify, only the message that is received by the interface device considered is shown here; it is understood, however, that the message is conveyed as a broadcast by controller 320 to all connected users.

Interface device 310 may then detect and suitably buffer the input port on which the recognition message is received, and/or the point in time of the receipt of the recognition message. It may then be checked by comparison with previously stored data whether a previous recognition message has already been received within the predefined time period.

If, on the other hand, no recognition message has been previously received or if it has been received some time ago, the recognition message may be duplicated as usual as a broadcast and may be passed along via all ports or at least via a defined portion of the ports of the interface device as duplicated recognition message 360a, 360b, 360c.

In order to check in steps 394, 395, 396 in each case whether a recognition message has been received multiple times on different ports within a predefined time period, point in time $t_1$ of the receipt of an instantaneous recognition message 370, for example, may be compared in step 395 with a previous point in time $t_0$ of a previous recognition message 360, which has been stored for this purpose. If a time period exists between these two points in time $t_0$ and $t_1$, which is shorter than predefined time period $\Delta t$, the forwarding of recognition message 370 is prevented by the check in step 395 and no further step is carried out. If, on the other hand, no time period exists between these two points in time that is greater than predefined time period T, the recognition message may be treated as a new recognition message and may accordingly be forwarded on all terminals. This case is represented as further recognition message 380, it being checked in step 396 whether the time period $\Delta t = t_2 - t_0$ is greater than a predefined time period T. Since this should be the case here, recognition message 380 is duplicated again and duplicated messages 380a, 380b are forwarded to remaining interface devices 312, 314, and 316. Accordingly, points in time $t_0$, $t_1$, $t_2$, at which a forwarded recognition message has been received, may each be stored for this purpose.

Alternatively, it is also possible for checking the time period between two recognition messages in steps 394, 395, 396 to start a timer upon receipt of a broadcast recognition message 360, which corresponds to the predefined time period. If a further recognition message 370 arrives on another port, it may then be checked whether an actively running timer is instantaneously present, and if this is the case, recognition message 370 may be omitted and not be further conveyed. If, on the other hand, no timer is active, recognition message 380 may be forwarded.

Modified, it could also be provided when using a timer that a reference to a received recognition message 360 is stored and that once the timer has expired, the reference to received recognition message 360 is deleted again. The reference in this case may be arbitrarily formed; for example, the input port of the recognition message may be stored; however, any other data entry is also suitable, which allows for a comparison. In this way, it may be checked upon arrival of a new recognition message 370 without a time stamp whether at the moment a stored reference to a recognition message is present. If this is the case, the timer has not yet expired, so that new recognition message 370 has thus arrived within the established time period and, in turn, is not to be forwarded. If, on the other hand, no stored entry is present at this point in time, new recognition message 380 as provided may be further conveyed as a broadcast on all remaining ports.

If the input port is to be taken into account for the check, it may be additionally checked whether the previous recognition message has been received on the same input port or on another input port, and if the previous recognition message is received on the same input port, the new recognition message may be forwarded regardless of the expiration of the time period.

In these variants, the timer may be started in each case immediately upon receipt of a broadcast message by the interface device and may be deactivated again if the recognition message is subsequently not to be forwarded. Even a temporarily stored reference to a recognition message may be deleted again if upon receipt it is decided that the message is not to be forwarded. This ensures that only periods of time since the initial forwarding of a recognition message are checked.

Figure 4:
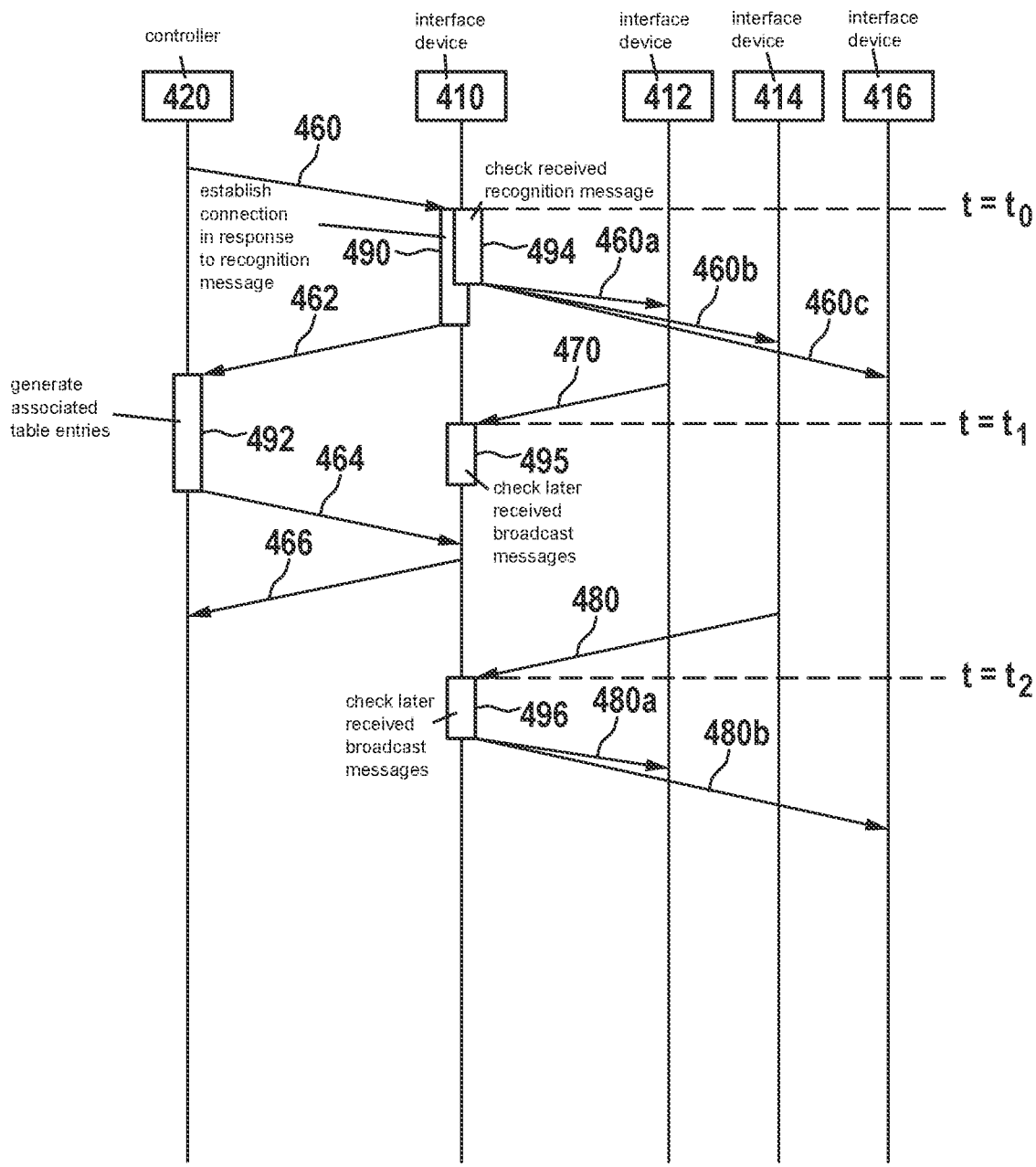
FIG. 4 shows a combination of the steps from FIGS. 3 and 4, according to an example embodiment of the present invention.

The check of the interface device whether a further conveyance is to take place may take place essentially regardless of the design of a unicast communication with the controller described in connection with FIG. 2, if previously no such communication connection exists. FIG. 4 shows by way of example both sub-methods combined. In this case, a connection between controller 420 and an interface device 410 is established via conveyance of a response message 462 in response 490 to a recognition message 460 similarly to the example from FIG. 2, the controller being able to generate associated table entries in step 492, which may then be utilized for further messages 464, 466. In addition, interface device 410 may check received recognition message 460 in step 494 and, if successfully checked, may convey it as duplicated messages 460a, 460b, 460c to remaining interfaces 412, 414, 416.

Thus, forwarding 460a, 460b, 460c may take place essentially in parallel or, to prevent delays, the check for forwarding the broadcast message and the conditional forwarding to other users may initially take place, and the further steps (for example, the conveyance of response message 462) for establishing the communication link with controller 420 are subsequently carried out. Forwarding on all ports as a broadcast also requires no pieces of controller information to be available to the interface device. If the time period since first broadcast message 460 is greater than the predefined time period, or the stopping of the forwarding in the case of message 470, which has been received within the predefined time period, the check of later received broadcast messages 470, 480 in steps 495 and 496 as well as the conditional forwarding as forwarded messages 480a, 480b to other users 412, 416 may take place similarly to the example described with FIG. 3, and is shown here merely for the sake of completeness.

The predefined time period, which is established for the check of the forwarding of the broadcast recognition message, may optionally also be changed by the interface device, by another network user or by the SDN controller, for example, via a corresponding control message. In the process, features such as the number of network users or the expected delay times when receiving messages may also be taken into account in order to establish the predefined time period. The predefined time period should, in particular, be long enough on the one hand in order to also stop the forwarding of broadcast messages, which arrive only after multiple other forwardings; on the other hand, no broadcast message is to be blocked, which is potentially already a new broadcast message. If the recognition messages are emitted by the central controller at predefined time intervals, the predefined time period for the check of received recognition messages may be adapted accordingly.

Optionally, the interface device in all cases may be configured in such a way that a further recognition message, which arrives on the same port within the established time period, is nevertheless forwarded regardless of the time interval, so that only recognition messages expire which have been received on other ports within the predefined time period. Alternatively, however, it may also be established that recognition messages are never forwarded within the established time period regardless of their input port.

Thus, with the steps described herein, it may be ensured that a recognition message reaches all connected users of a network as quickly as possible without overloading the network by unnecessary duplication in the process.

It is understood that the method described herein may also be applied in such a network for other broadcast messages or multicast messages, if such messages are provided in a protocol for purposes other than for recognizing users. The described network users, the protocol structures used and messages are also understood to be merely exemplary and may be modified within the scope of the described idea. In the present examples, only one controller and a few interface devices, respectively, have been shown; the method may of course, however, be transferred to a plurality of interface devices and multiple controllers in arbitrary topologies. While initially the receipt of a broadcast message directly from the controller has been described in all examples, this message may, of course, also be received indirectly via a path that includes one or multiple intervening interface connections.

What is claimed is:

1. A method for integrating interface devices into a network, the network including at least one central software-based controller, which logically separates a data plane from a control plane using multiple interface devices, the method comprising the following steps: receiving a first recognition message of the central controller at a terminal of an interface device; checking whether a previous recognition message has been received at another terminal of the interface device within a predefined time period prior to the receipt of the first recognition message; and forwarding the first recognition message to all network users connected to the interface device, when no previous recognition message has been received at another terminal within the predefined time period.

2. The method as recited in claim 1, wherein the checking includes:
retrieving a stored point in time at which the previous recognition message has been received, and determining a time period that has elapsed between the stored point in time and a point in time at which the first recognition message has been received.

3. The method as recited in claim 1, further comprising: when the first recognition message is forwarded, storing a point in time at which the first recognition message was received.

4. The method as recited in claim 1, further comprising: starting a timer for a duration of the predefined time period starting from the receipt of the first recognition message, wherein the check of whether a previous recognition has been received at another terminal of the interface device within the predefined time period prior to the receipt of the first recognition message includes: checking whether an active timer of a previous recognition message is present.

5. The method as recited in claim 1, further comprising: starting a timer for a duration of the predefined time period when receiving a recognition message, and storing a reference to the recognition message; and deleting the stored reference to the recognition message after expiration of the timer; wherein the check of whether a previous recognition message has been received at another terminal of the interface device within a predefined time period prior to the receipt of the first recognition message includes: checking whether a stored reference to a recognition message is present.

6. The method as recited in claim 4, further comprising: deactivating the timer when the first recognition message is not forwarded.

7. The method as recited in claim 5, further comprising: deleting the stored reference to the first recognition message when the recognition message is not forwarded.

8. The method as recited in claim 1, further comprising: detecting the terminal of the interface device on which the first recognition message has been received; wherein the checking includes: checking whether the previous recognition message was received on the same terminal, and when the previous recognition message was received on the same terminal, forwarding the first recognition message regardless of whether it has been received within the predefined time period.

9. The method as recited in claim 1, further comprising: establishing a communication link between the central controller and the interface device in response to the receipt of the first recognition message.

10. The method as recited in claim 1, wherein the first recognition message includes at least one data element, which indicates that the first recognition message is provided for forwarding to other network users.

11. A processing unit configured for integrating interface devices into a network, the network including at least one central software-based controller, which logically separates a data plane from a control plane using multiple interface devices, the processing unit configured to: receive a first recognition message of the central controller at a terminal of an interface device; check whether a previous recognition message has been received at another terminal of the interface device within a predefined time period prior to the receipt of the first recognition message; and forward the first recognition message to all network users connected to the interface device, when no previous recognition message has been received at another terminal within the predefined time period.

12. A non-transitory machine-readable memory medium on which is stored a computer program for integrating interface devices into a network, the network including at least one central software-based controller, which logically separates a data plane from a control plane using multiple interface devices, the computer program, when executed by a processor, causing the processor to perform the following steps:

receiving a first recognition message of the central controller at a terminal of an interface device;

checking whether a previous recognition message has been received at another terminal of the interface device within a predefined time period prior to the receipt of the first recognition message; and forwarding the first recognition message to all network users connected to the interface device, when no previous recognition message has been received at another terminal within the predefined time period.

* * * * *